Figure 1:
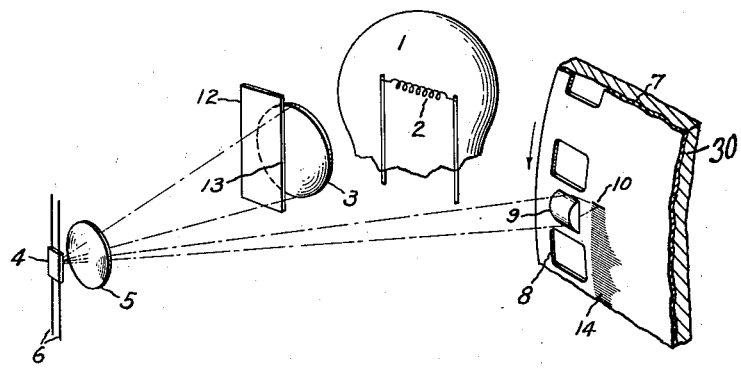

Aug. 13, 1935.  A. C. HARDY  2,010,951
APPARATUS FOR RECORDING AND REPRODUCING SOUND
Filed Oct. 16, 1928

Inventor
Arthur C. Hardy,
by Charles R. Tullar
His Attorney.

Patented Aug. 13, 1935

2,010,951

UNITED STATES PATENT OFFICE 2,010,951

APPARATUS FOR RECORDING AND REPRODUCING SOUND

Arthur C. Hardy, Wellesley, Mass., assignor to General Electric Company, a corporation of New York Application October 16, 1928, Serial No. 312,909

2 Claims. (Cl. 179—100.3)

My invention relates to apparatus for photographically recording sound and to apparatus for reproducing the sound from a previously made photographic sound record.

It is a well recognized fact that where sound is to be recorded on a film which is being moved at a speed, such for example as is common in the motion picture art, or where it is to be reproduced from a previously made record moving at a corresponding speed, the beam of light respectively which varies with the sound waves and exposes the sensitive film in the case of the recorder and which is caused to pass through the film record into the photo-electric cell in the case of the reproducer must be extremely narrow in order that the high frequency notes and the overtones which give character to the sound shall not be lost. Various means have been used in the past for limiting the width of the effective light beam. One form of apparatus employs a screen arranged close in front of the moving film having a light aperture therein of the order of one mil in width. With such apparatus numerous difficulties are encountered such as clogging up of the aperture with dust and dirt from the adjacent moving film, the danger of scratching the film from accidental contact with the aperture screen, the provision of a satisfactory supporting means for the moving film at the point where it passes the aperture and the commercial manufacture of screens having light apertures therein of such extreme narrowness. Another means which has been used for limiting the width of the light beam projected on the film is that known as the "focused aperture" wherein a light aperture of much larger dimensions than that required for the light beam is imaged optically at a reduced scale on the film. Such apparatus has the advantage of avoiding the use of an extremely narrow aperture close to the film but nevertheless does require a screen having an aperture therein which indeed is so narrow that it may easily become partly obstructed by particles of dust and dirt, the image of which cast on the film appears like a scratch. Attempts also have been made to project a light beam of the desired narrowness on the film in the case of a reproducer by using a linear filament as a light source and imaging the filament on a reduced scale on the film record and by using a linear photo-electric cell whose width determined the effective width of the light beam. Both of these expedients have been found to have mechanical limitations not easily overcome. A further difficulty which in general is common to all apparatus of this character heretofore proposed is that of obtaining a sufficient intensity of light in the narrow beam projected on the film.

It is an object of my invention to provide improved apparatus for recording sound upon films and for reproducing sound from film records which avoids the difficulty of obtaining sufficient light. Another object of my invention is the provision of improved apparatus of this character wherein a light beam of the desired narrow width is obtainable without the objections referred to of the former apparatus.

My invention will be better understood from the following description taken in connection with the accompanying drawing, and its scope will be pointed out in the appended claims.

Figure 2:
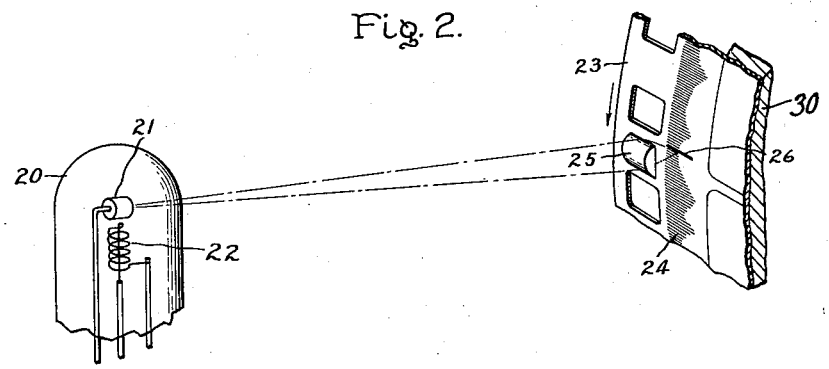
Figure 3:
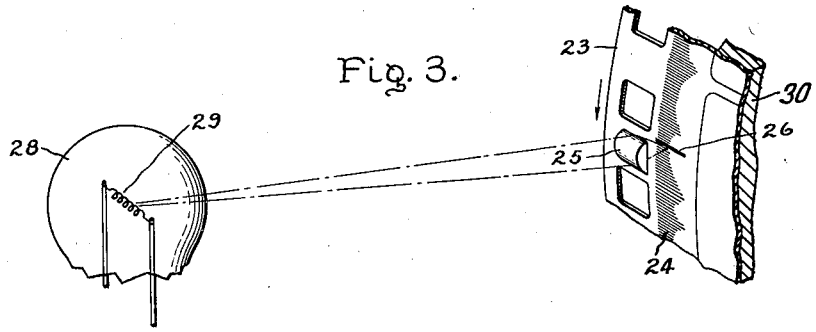

Referring to the drawing Fig. 1 illustrates on a greatly enlarged scale an embodiment of my invention forming a part of a sound recording apparatus; Fig. 2 illustrates another embodiment also on an enlarged scale of my invention forming a part of a sound reproducing apparatus; and Fig. 3 is modification of Fig. 2.

In illustrating my invention I have shown the apparatus greatly enlarged for the sake of clearness but have not attempted to show all of the parts in their correct proportions. In Fig. 1 light from a suitable source 1, shown as an incandescent lamp having a small coiled filament 2, is collected by the condensing lens 3 and directed on the sound-responsive mirror 4 through the convex spherical lens 5. Various means may be employed to vibrate the mirror 4 in accordance with the sound waves. It may for example have a direct mechanical connection with a sound-actuated diaphragm or it may comprise a part of the moving system of an oscillograph which is adapted to operate in response to electric vibrations corresponding to the sound vibrations to be recorded. In Fig. 1 I have shown the mirror as a part of an oscillograph having a moving system of the bifilar type wherein the two slender conductors 6 supporting the mirror extend through a magnetic field all in the common and well known manner. Light reflected by the mirror after passing again through lens 5 is directed toward the sensitive film 7 which supported by suitable means 30, such as a drum or skid, is moved at a uniform speed in the direction of the arrow. A fragment of the film only at one edge is shown having sprocket holes 8. Adjacent the moving film 7 is the small cylindrical lens 9 characterized by the fact that it has a very short focal length but has a large numerical aperture. By means of this lens which I have shown as a plano-convex lens arranged with the axis parallel to the direction of movement of the vibrated beam light from the mirror 4 is refracted to form on the film the sharp light line 10 of the desired brilliancy and narrow width. The lamp 1 and lens 3 serve only to fill the mirror with light. Use of the lens 5 although preferred is not essential and if found desirable it may be omitted. From that point on, the mirror itself may be considered as a light source which by means of the lenses 5 and 9 is imaged so to speak on the film in the form of a brilliant light line.

In apparatus of this general character heretofore constructed a line of light on the film of the desired narrow width has been obtained by the use of a screen close in front of the film having a slit therein of the width desired of the beam or has been obtained by projecting on the film a reduced image of a narrow light slit arranged at some point in front thereof. Both of these apparatus have their objections as has already been mentioned. I am aware of the fact that in certain forms of the first mentioned apparatus a cylindrical lens has been used between the mirror and the film to concentrate the light beam into a more intense band covering the slit in the screen. The slit however has heretofore always been found indispensable and as far as I am aware no one before has been able successfully to produce an image of the mirror on the film by means of a cylindrical lens arranged in the manner illustrated and without the use of a close up slit which image has the characteristics of brilliancy, narrowness and sharpness necessary for the faithful recording of speech and music. A standard oscillograph vibrator, such as I have used, has a mirror approximately 60 mils in height and 20 mils in width and is capable of a maximum deflection without overheating of approximately 3°. In using such a vibrator for making sound records where the desired amplitude on the film is not over 60 mils I have found that a much greater light efficiency could be obtained if the distance between the mirror and the film were reduced from a distance of approximately 10 inches more or less common in oscillography to a distance of the order of one inch. Also I have found that by using a very small cylindrical lens adjacent to but sufficiently spaced from the film to provide ample clearance to avoid danger of actual contact I can obtain on the film a light line having all the desired qualities of brilliance, narrowness and sharpness. With an arrangement such as I have illustrated employing a cylindrical lens 4.91 mm. long and having a radius of curvature of 1.60 mm. I have produced a photographed image of the mirror 0.5 of a mil in width. As this dimension is less than the resolving power of the photographic material it is probable that the actual optical image is somewhat smaller than this. The reason that I have been able to attain such results with the simple apparatus employed may be explained as being due to the close arrangement of mirror and film, the large numerical aperture of the cylindrical lens and to the avoidance of the effects of spherical aberration in the cylindrical lens. I do not attempt to grind the cylindrical lens to eliminate all such aberration, it being well known that the avoidance of aberration in a cylindrical lens is much more difficult than in the case of a spherical lens, but rely rather on the fact that because of the short focus of the lens the effect of a normal amount of aberration is negligible.

When the above described apparatus is used for making a sound record of the variable width type it is usually thought to be desirable to have that end of the light strip or image 10 which determines the shape of the sound record terminate sharply. For this purpose I have shown the screen 12 having the sharp edge 13 which screen is so placed that its edge is focused by lens 5 on the film.

The required width of the line of light 10 on the film is governed by a number of factors such as the speed of the film, the sensitiveness of emulsion, the frequency of vibrations to be recorded, quantity of light available, etc. For the faithful recording of sound such as speech or music the light line must be of such a narrow width and have such a sharp definition that with a given film speed all of the high frequency notes and high frequency components or overtones shall distinctly appear in the record. When sound and motion picture records are made simultaneously on the same film, the film speed usually is predetermined by the picture requirements.

To assist in the clear understanding of the invention I have shown the exposed portion 14 of the film as if it were visible, it being understood of course that a development of the film actually is necessary before the sound record can be seen. In the interest of clearness in the drawing I have also omitted showing any of the supporting structure for the apparatus illustrated and any of the necessary housing by which the film is protected from the light except at the point at which the exposure is to be made. Because of the extremely short distance between the mirror and the film it may be found desirable in certain cases to employ a prism or mirror between the oscillograph mirror and the lamp for convenience in mounting the lamp and condensing lens. By reason of the high light efficiency of the apparatus which I have devised I have found that I can obtain sufficient light from such small incandescent lamps as are commonly employed in hand flash lights and operated by a few dry battery cells. Particles of dust which may cling to the face of the mirror or to the face of the cylindrical lens are not focused on the film and hence do not cause long streaks of unequal exposure thereon. Among other advantages of the compactness of this arrangement is that recording and reproducing apparatus may be made up in conveniently small portable outfits well adapted for news reel, home work, vacation trips, etc.

In that embodiment of my invention illustrated by Fig. 2 I have shown a portion of the apparatus for reproducing sound from a film record. The source of light 20 is here shown as an enclosed arc having electrodes 21 and 22, the latter of which is a heating coil. A lamp of this type provides an intense and concentrated light source and for a more full description of the same reference is had to the Friederich Patent 1,393,520, October 11, 1921. Supported adjacent to the film 23 bearing the sound record 24 thereon is the small cylindrical lens 25 which is similar in all respects to the cylindrical lens 9 in Fig. 1. Light from this concentrated source is imaged on that portion of the film bearing the sound record 24 in the form of a fixed line of light 26 which while brilliant is narrow and sharp. Behind the film is a photo-electric device or cell, not shown, into which passes light from the light strip, the amount of light reaching the cell at any instant being controlled by the record. In the modified form illustrated by Fig. 3, I have shown the source of light as the incandescent lamp 28 having a concentrated filament in the form of the small coil 29. The arrangement shown in this figure otherwise is like that shown in Fig. 2.

From the above description taken in connection with the accompanying drawing it will be seen that I have provided an improved apparatus for use in recording sound or other vibrations on a moving photo-sensitive member or for use in the process of reproducing the sound or vibrations from a photographic record thereof which avoids all use of a screen having a slit or aperture therein to govern the light beam, and which produces on the sensitive surface or on the record as the case may be a line of light having the desired brilliancy, narrow width and sharpness. It will also be seen that the apparatus by which I obtain these results is extremely simple, economical of manufacture and compact.

What I claim as new and desire to secure by Letters Patent of the United States, is:

1. Apparatus of the character described comprising a limited area light source, an uncorrected plano-cylindrical lens having an aperture at least fifty times as great as the image to be formed and a radius of curvature of the order of 1.6 mm. and arranged in the path of light from said source a distance from said source which is great in relation to its focal length, and means in the otherwise unobstructed path of light from said lens for supporting a film in the plane of the image of said source produced by said lens whereby a light line of narrowness corresponding to high sound frequencies is produced on the film independent of aberrations of said lens.

2. Apparatus for recording sound on film comprising a mirror of limited area, means for vibrating said mirror in accordance with the sound to be recorded, a source of light, a lens arranged to direct light from said source to said mirror, means for focusing light from said mirror on a film consisting of an uncorrected plano-cylindrical lens having an aperture at least fifty times as great as the width of the image to be formed and a radius of curvature of the order of 1.6 mm. and arranged in the path of light reflected by said mirror at a distance from said mirror great relative to the focal length of the lens, and means for supporting a film in the plane in which an image of said mirror is focused by said cylindrical lens whereby a light line of the necessary narrowness to record the high frequencies of sound is produced on the film independent of aberrations of said lens.

ARTHUR C. HARDY.